(No Model.)

A. A. WEBER.
SELF OILING CAR AXLE.

No. 426,886. Patented Apr. 29, 1890.

WITNESSES

INVENTOR
Albert A. Weber,
by E. W. Anderson
Attorney

United States Patent Office.

ALBERT AUGUST WEBER, OF SACRAMENTO, CALIFORNIA.

SELF-OILING CAR-AXLE.

SPECIFICATION forming part of Letters Patent No. 426,886, dated April 29, 1890.

Application filed January 30, 1890. Serial No. 338,630. (No model.)

*To all whom it may concern:*

Be it known that I, ALBERT AUGUST WEBER, a citizen of the United States, and a resident of Sacramento, in the county of Sacramento and State of California, have invented certain new and useful Improvements in Self-Oiling Car-Axle Boxes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
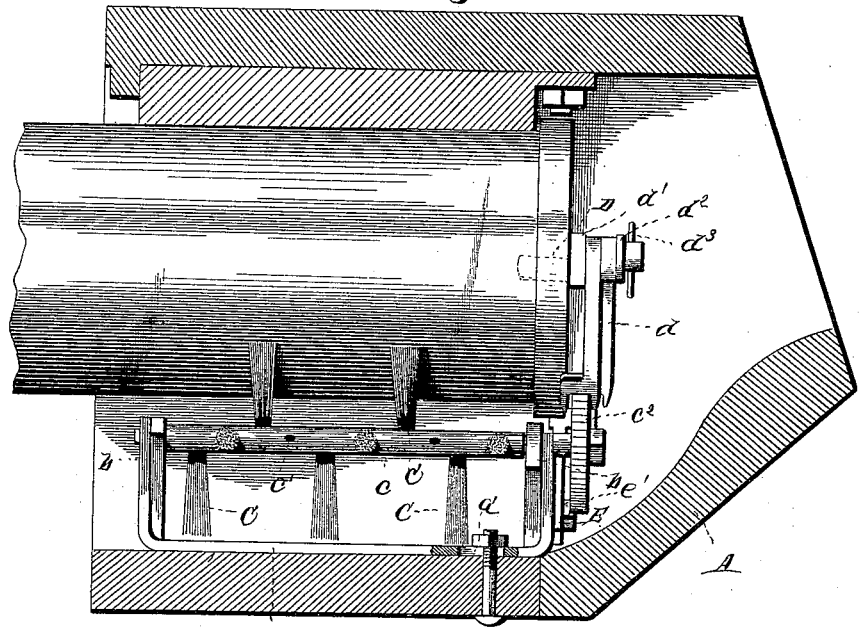
Figure 3:
Figure 2:
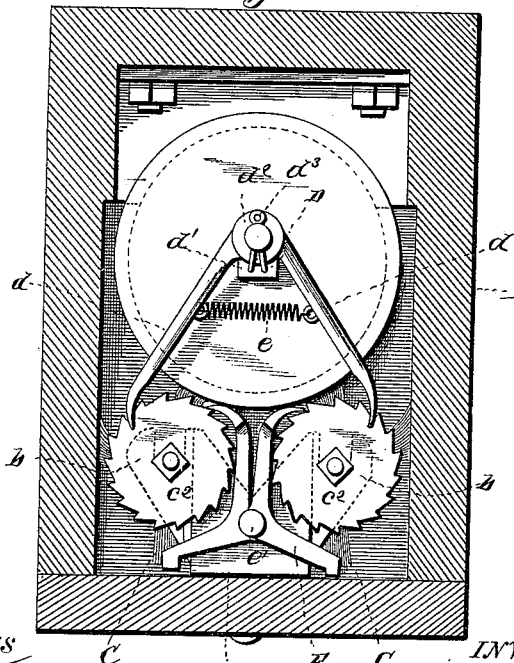
Figure 4:
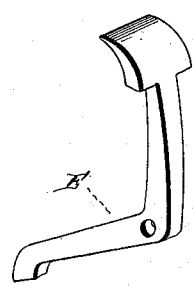

Figure 1 of the drawings is a vertical longitudinal section. Fig. 2 is a cross-section of the box with the interior exposed. Figs. 3 and 4 are detail views.

This invention relates to certain improvements in car-axle lubricators; and it consists of the novel combination and construction of parts as will appear from the following description and accompanying illustration:

In accordance with my invention I secure adjustably to the bottom of the car-axle box A the plate B by means of a bolt and its nut $a$, passing through a slot $a'$ in said plate and through said bottom, to adapt it to car-boxes and axles of different sizes. The plate B has at its ends upwardly-projecting studs or bearings $b\ b$, the outer or forward studs or bearings having slots in their upper edges or ends, and the inner or rear studs or bearings having in their upper ends apertures to support the shafts $c\ c$ of parallel brushes C C, which are designed to take up the lubricant—any kind of grease or oil—and apply it to the axle. Each of the axles is provided with a spirally-arranged series of apertures $c'\ c'$, into which the bristles of the brushes are suitably secured. Upon the forward or outer ends of the brush-shafts $c\ c$ are secured, by nuts and shoulders on said shafts, ratchet-wheels $c^2\ c^2$, which are engaged by pawls $d\ d$, carried by an eccentric or crank-shaft D, secured to the end of the car-axle. The crank-shaft or eccentric D has a plate or shoulder $d'$ between its arm bearing the pawls and the car-axle holding the pawls out of contact with the latter and fitted upon it. Outside of said pawls is a washer or disk $d^2$, and through it, outside of the washer or disk, is a pin $d^3$, holding the washer and pawls in place thereon. These pawls are bifurcated at their lower ends, so as to embrace the ratchet-wheels $c^2\ c^2$ and yet engage the teeth of said wheels, and are connected together under spring-pressure by a spring $e$. Thus it is obvious that as the car-axle revolves it will carry with it the eccentric or crank-shaft, and this in turn will alternately engage the pawls with and revolve the ratchet-wheels and with them the brushes, whereby the lubricant will be automatically fed or applied to the car-axle.

E E are gravity-pawls, which are of approximate right-angle shape, and are pivoted or hung at their angles upon a bolt $e'$, projecting from an upwardly-extending stud of the plate B, and which are adapted to engage the ratchet-wheels $c^2\ c^2$, so as to prevent the brush-shafts jumping from or leaving their bearings, as would otherwise liable to be the case from concussion. This lubricant effects the proper and economical feeding of the lubricant and only requires replenishing with lubricant at long intervals, and can be made light and cheap.

Having thus described this invention, what I claim, and desire to secure by Letters Patent, is—

1. The lubricator having parallel brushes, the shafts of which are provided with ratchet-wheels, in combination with the car-axle having an eccentric or crank-shaft, and the spring-connected pawls carried by said eccentric or crank-shaft and engaging said wheels, substantially as specified.

2. The lubricator having parallel brushes, the shafts of which are provided with ratchet-wheels, in combination with the car-axle having an eccentric or crank-shaft, the spring-connected pawls carried by said eccentric or crank-shaft and engaging said wheels, and the gravity-pawls engaging said ratchets, preventing said brush-shafts leaving their bearings, substantially as specified.

In testimony whereof I have affixed my signature in presence of two witnesses.

ALBERT AUGUST WEBER.

Witnesses:
   WM. GUTENBERGER,
   J. W. HUGHES.